United States Patent [19]

Payre et al.

[11] Patent Number: 4,784,217

[45] Date of Patent: Nov. 15, 1988

[54] THERMOCHEMICAL METHOD AND DEVICE FOR STORING AND UNSTORING HEAT

[75] Inventors: Didier Payre, Perpignan; Nathalie Mazet, Castelnau le Lez; Sylvain Mauran; Bernard Spinner, both of Perpignan, all of France

[73] Assignee: Societe Nationale Elf Aquitaine, Courbevoie, France

[21] Appl. No.: 869,528

[22] Filed: Jun. 2, 1986

[30] Foreign Application Priority Data

Jun. 4, 1985 [FR] France ............................ 85 08408

[51] Int. Cl.$^4$ ............................................. F25B 17/00
[52] U.S. Cl. .................................. 165/104.12; 62/112; 62/477; 62/480
[58] Field of Search ...................... 165/104.12; 62/480

[56] References Cited

U.S. PATENT DOCUMENTS

| | | | |
|---|---|---|---|
| 4,161,211 | 7/1979 | Duffy et al. | 165/104.12 |
| 4,178,987 | 12/1979 | Bowman et al. | 165/104.12 |
| 4,200,144 | 4/1980 | Sirovich | 165/104.12 |
| 4,262,739 | 4/1981 | Gruen . | |
| 4,319,626 | 3/1982 | Papazian et al. | 165/104.12 |
| 4,365,475 | 12/1982 | Dunlap | 165/104.12 |
| 4,372,376 | 2/1983 | Nelson . | |
| 4,411,384 | 10/1983 | Dunlap . | |

FOREIGN PATENT DOCUMENTS 2526926 11/1983 France .

*Primary Examiner*—Albert W. Davis, Jr.
*Attorney, Agent, or Firm*—Weiser & Stapler

[57] ABSTRACT

Thermotransformer for storing and unstoring heat with a double raise in thermal potential by performing thermo-chemical processes that present Clapeyron curves that intersect in the temperature range involved, this device being applicable to heat pumps and the handling of thermal energy.

12 Claims, 4 Drawing Sheets

THERMOCHEMICAL METHOD AND DEVICE FOR STORING AND UNSTORING HEAT

BACKGROUND OF THE INVENTION

Field of the Invention

The present invention concerns a thermotransformer, i.e. a heat pump able to supply calories at a temperature higher than that of the external source, according to a process in which the thermal potential is raised twice. More particularly, the invention concerns a thermotransformer in which the physico-chemical processes involve either a reaction between a gas and a solid possibly in suspension in an inert solvent, or the absorption between a gas and a possibly saturated solution.

European patent application No. 130908 published on Jan. 9, 1985 describes a thermochemical heat pump in which the exchange of calories between a heat source and the reaction medium occurs during a reaction between a gas and a liquid phase constituted by a saturated solution of a solid, or by two non miscible liquids.

This reaction is monovariant so that the calories are delivered at a constant temperature. When referring to FIG. 3 of this European patent application, it will be noted that during the reaction corresponding to the storing out of the heat, there is a drop of the thermal potential since the temperature Ta is lower than the temperature Th.

On the contrary, the present invention provides a device and a method according to which there is no drop in the thermal potential during the heat unstoring phase.

SUMMARY OF THE INVENTION

In order to do this, the invention provides a thermochemical device for storing and unstoring heat, comprising two reactors each in contact with an external medium and connected to each other by a communicating pipe, said reactors and said pipe defining a confined space, each reactor comprising at least one reagent adapted to produce a reversible exothermic or endothermic reaction in the presence of a gas, in which device the reactions present, in the Clapeyron diagram, curves which intersect in the working temperature range of the device.

Such a device can have a particularly useful application in the handling of thermal energy.

The same gas is preferably used in each reactor and according to a preferred embodiment, at least one of the reactions is monovariant.

The invention also provides a thermochemical method for storing of and unstoring heat, wherein two physico-chemical processes are carried out allowing to exchange calories between at least one reactive medium and at least one external medium and wherein these physico-chemical processes are reactions which present, in the Clapeyron diagram, curves that intersect in the temperature range within which the method is carried out.

The method according to the invention can also constitute a heat pump operation. To this end, it is sufficient to carry out said processes simultaneously, thus allowing to feed one process with the calories supplied by the other.

In the method according to the invention each one of the physico-chemical reactions preferably uses a gas and at least one reagent adapted to initiate a reversible exothermal or endothermal reaction when said gas is present.

Preferably the same gas is used for both reactions and may be selected from the group including $H_2$, $H_2O$ vapor (steam), $CO_2$, $SO_2$, $SO_3$, $SO_2/SO_3$ mixtures, ammonia and its derivatives, $NO_2$ and the alcohols.

According to a supplementary feature, at least one of said reactions is monovariant. It has then one degree of freedom, and when, for example, its temperature is fixed, its pressure is determined thereby.

In accordance with a first embodiment of the invention, said reagent is a solid substance adapted to release said gas. Said solid substance is preferably selected from the group including: $CeNi_3Cu_2$, $CeNi_{2.5}Cu_{2.5}$, $Ce_{11}Ni_{2.5}Cu_{2.5}$, $LaNi_5$, $LaNi_5$, $LaNi_{4.9}Al_{0.1}$, $LaNi_{4.75}Al_{0.25}$, $LaNi_{4.6}Al_{0.4}$, $LaNi_{4.5}Al_{0.5}$, $LaNi_{4.25}Al_{0.75}$, $LaNi_4Al$, $LaNi_{4.95}Mn_{0.5}$, $LaNi_{4.83}Mn_{0.17}$, $LaNi_{4.65}Mn_{0.35}$, $LaNi_{4.56}Mn_{0.44}$, $LaNi_{4.30}Mn_{0.70}$, $LaNi_{4.06}Mn_{0.94}$, $Zr_{0.8}Ti_{0.2}MnFe$, $ZrCr_{0.6}Fe_{1.4}$, $Zr_{0.8}Ti_{0.2}Cr_{0.6}Fe_{1.4}$, $Zr_{0.7}Ti_{0.3}Mn_2$, $Zr_{0.8}Ce_{0.2}Mn_2$, $ZrMn_{2.8}$, $ZrMn_{3.8}$, $ZrMn_2Cu_{0.8}$, $NiZr$, $Mg_{2.4}Ni$, $Mg(LaNi_5)$ 20%.

However, in accordance with another embodiment of the invention said reagent is constituted by a saturated solution of a solid, such as an ammoniated nitrate, an ammoniated zinc sulphate, an ammoniated calcium chloride.

BRIEF DESCRIPTION OF THE DRAWING

The invention will become more apparent from the following description, given by way of non limitative illustration with reference to the appended drawing in which.

DESCRIPTION OF THE PREFERRED EMBODIMENTS

Figure 1:
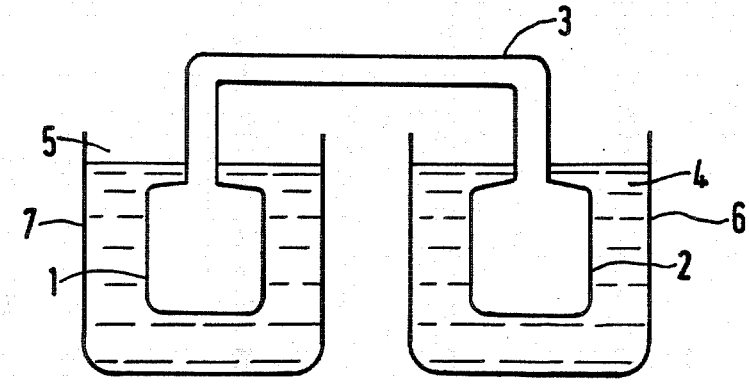
FIG. 1 is a schematic view of a device according to the invention.
Figure 2:
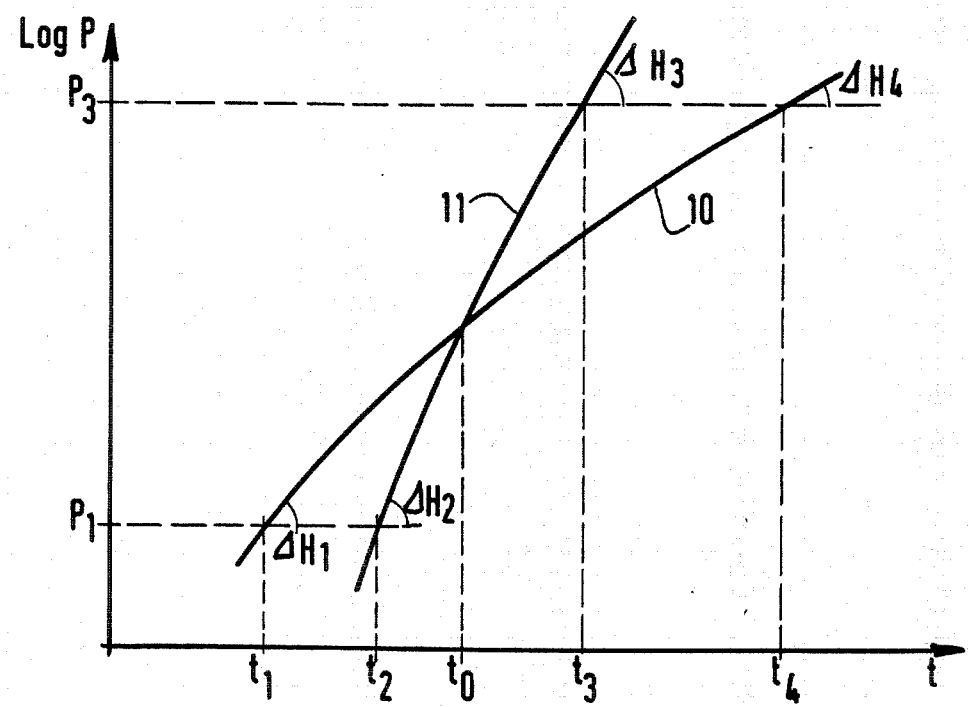
FIGS. 2 to 4 are Clapeyron diagrams that represent, for a given thermochemical reaction, the variations of the neperian logarithm of the pressure in function of the temperature.

FIG. 1 represents schematically thermotransformer plant realized according to the invention and FIG. 2 represents the curves of the physico-chemical equilibrium according to the Clapeyron coordinates.

The device represented in FIG. 1 comprises two reactors 1 and 2 connected to each other by a pipe 3. Each reactor is placed in contact with an external medium 4 and 5 represented as being contained in the enclosures 6 and 7.

Each reactor receives reagents that are adapted to react with one selected gas so as to perform reversible and monovariant exothermic or endothermic reactions. Examples of such reagents will be given herein-under.

In reactor 1, reagents $R_1$ and $R_2$ react with the gas G according to the reaction:

$$\Delta H_1 + R_1 \langle \rightleftarrows \rangle G + R_2 \tag{I}$$

Similarly, in reactor 2:

$$R_3 + G \langle \rightleftarrows \rangle R_4 + \Delta H_2 \tag{II}$$

The equilibrium curves of these reactions are represented in FIG. 2, curve 10 corresponding to reactor 1 and curve 11 to reactor 2; these curves intersect at a point corresponding to a temperature to.

The device operates in the following way:

1. Storing in phase

Calories $\Delta H_1$ are supplied at a temperature t1 to reactor 1. The reaction (I) occurs in the direction of production of gas G at a pressure $P_1$. This gas is introduced into reactor 2 by pipe 3 at the same pressure.

Reaction (II) is thus initiated and occurs at temperature t2 and supplies calories $\Delta H_2$. Temperature t2 is higher than t1 but lower than to.

2. Unstoring stage

Calories $\Delta H_3$ are supplied to reactor 2, at a temperature t3 higher than the temperature to. The reaction occurs in the direction of production of gas G at pressure $P_3$. During its passage in the reactor 1, the gas G reacts with $R_2$ and in the exothermic direction of the reaction (I) so as to supply calories $H_4$ at temperature t4.

It will be seen that the device according to the prior art operate with a drop in thermal potential during the unstoring phase.

Figure 3:
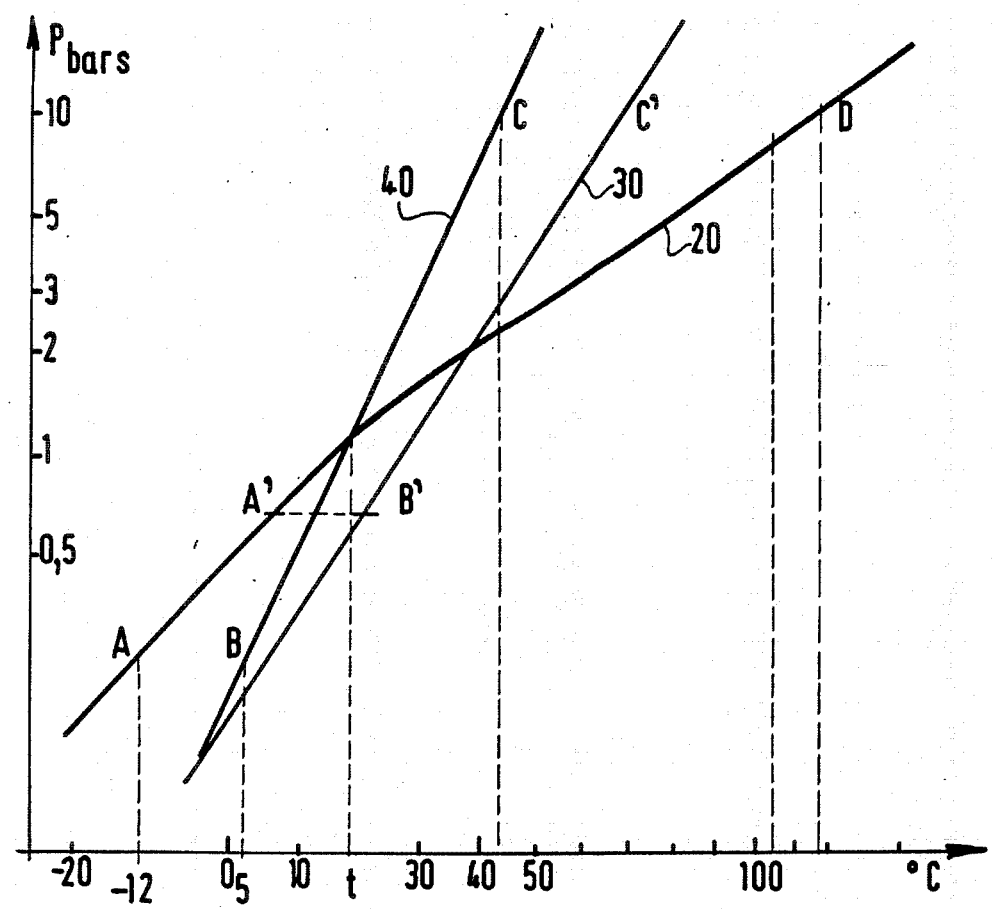

FIG. 3 represents the Clapeyron curves corresponding to specifically defined reagents that are described in the following examples.

EXAMPLE 1

An ammoniated nitrite solution is placed in water into reactor 1 and is adapted to react according to the relation:

$$\Delta H_1 (NH_4)_3 NO_3 <\rightleftarrows> NH_3 + NH_4 NO_4$$

This equilibrium is represented by curve 20 of FIG. 3.

Thus a reversible monovariant equilibrium reaction between a gas and a saturated solution will occur in this reactor.

In the reactor 2, a reaction between the gas ($NH_3$) and a solid (ammoniated zinc sulfate) is initiated according to the monovariant relation:

$$Zn(NH_3)_5 SO_4 <\rightleftarrows> Zn(NH_3)_3 SO_4 + 2NH_3$$

This equilibrium is represented by curve 40.

While operating, the storing in phase is performed by pumping calories at $-12°$ C. (t1). These are evacuated at 5° C. (points A and B on FIG. 3). For the unstoring, calories from a source at 40° C. (point C) are used to produce calories at 115° C. (point D).

EXAMPLE 2

The reaction in reactor 1 is the same as that of the previous example but in reactor 2 a reaction between the ammonia and the ammoniated calcium chloride occurs as follows:

$$CaCl_2(NH_3)_8 <\rightleftarrows> CaCl_2(NH_3)_4 + 4NH_3$$

This equilibrium is represented by curve 30 on FIG. 3.

While operating, the calories are pumped at 5° C., and they are recovered at 20° C. (points A' and B'). For the unstoring, the calories are used at 70° C. and recovered at 115° C. (D and C').

The present invention can also be carried out with another gas, for example, methylamine $CH_3NH_2$.

For example, it is possible to provide in reactor 1 a saturated solution of potassium thiocyanate reacting with the methylamine, and in reactor 2 the equilibrium will be established:

$$CaCl_2(CH_3NH_2)_6 <\rightleftarrows> CaCl_2(CH_3NH_2)_2 + 4CH_3NH_2$$

Figure 4:
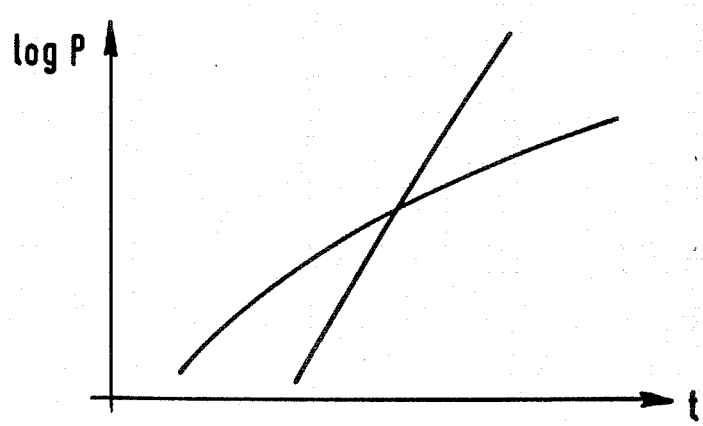

FIG. 4 represents the corresponding equilibrium curves.

The main advantage of the method according to the invention resides in its flexibility as regards the selection of the reagents to be used. Thus the following examples are based upon reactions involving absorption of hydrogen by metals or mixtures of metals, resulting in the formation of hydrides.

Figure 5:
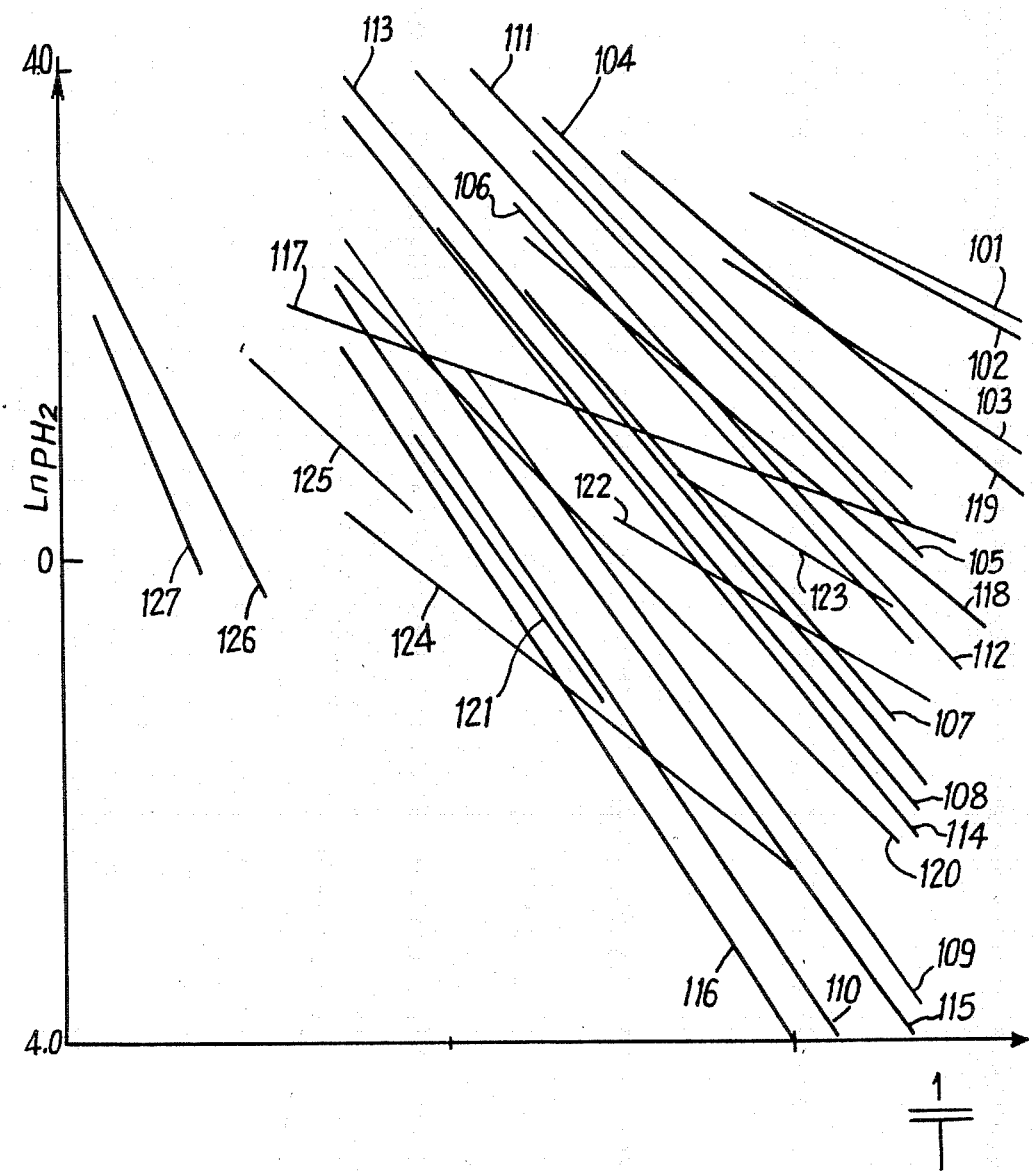
FIGS. 5 and 6 are Clapeyron diagrams for equilibrium states between an alloy, hydrogen and the corresponding hydride.

FIG. 5 is a view similar to FIGS. 2, 3 and 4, but has been drafted as a function of the inverse of the temperature; for this reason the slopes of the straight lines have opposite signs.

This FIG. 5 shows the Clapeyron diagrams for a series of alloys in the equilibrium state with hydrogen and the corresponding hydride.

In this figure the various reference numerals correspond to the following alloys:

101: $CeNi_3Cu_2$,
102: $CeNi_{2.5}Cu_{2.5}$,
103: $Ce_{11}Ni_{2.5}Cu_{2.5}$,
104: $LaNi_5$,
105: $LaNi_{4.9}Al_{0.1}$,
106: $LaNi_{4.75}Al_{0.25}$,
107: $LaNi_{4.6}Al_{0.4}$,
108: $LaNi_{4.5}Al_{0.5}$,
109: $LaNi_{4.25}Al_{0.75}$,
110: $LaNi_4Al$,
111: $LaNi_{4.95}Mn_{0.5}$,
112: $LaNi_{4.83}Mn_{0.17}$,
113: $LaNi_{4.65}Mn_{0.35}$,
114: $LaNi_{4.56}Mn_{0.44}$,
115: $LaNi_{4.30}Mn_{0.70}$,
116: $LaNi_{4.06}Mn_{0.94}$,
117: $Zr_{0.8}Ti_{0.2}MnFe$,
118: $ZrCr_{0.6}Fe_{1.4}$,
119: $Zr_{0.8}Ti_{0.2}Cr_{0.6}Fe_{1.4}$,
120: $Zr_{0.7}Ti_{0.3}Mn_2$,
121: $Zr_{0.8}Ce_{0.2}Mn_2$,
122: $ZrMn_{2.8}$,
123: $ZrMn_{3.8}$,
124: $ZrMn_2Cu_{0.8}$,
125: $NiZr$,
126: $Mg_{2.4}Ni$,
127: $Mg(LaNi_5)$ 20%.

With a view to carrying out a method according to the invention it is only necessary to select two pairs of alloys, for example $Zr_{0.8}TiO_2MnFe$ (Curve 117) and $LaNi_{4.75}AlO_{2.5}$ (Curve 107).

The two curves 117 and 107, when converted into a Clapeyron diagram represented as a function of t (not 1/T) have a shape quite similar to that of the curves shown in FIGS. 2 to 4.

Once the reagents have been selected the method is initiated as soon as the gasous medium—hydrogen in the present case—is put into place.

Figure 6:
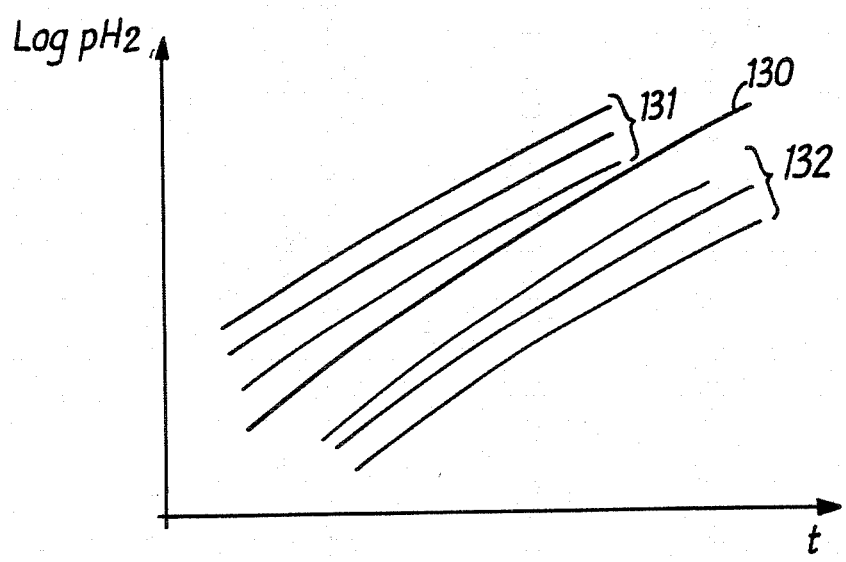

However the method may be carried out, too, using mixtures of alloys, or also non stoechiometric hydrides. In this case the isosteric curves 131, 132 are applicable, such as shown in FIG. 6 where curve 130 is the stoechiometric curve. Obviously the prevailing reaction conditions then are no longer monovariant, but divariant.

In order to improve the thermal exchanges, any disposition allowing to homogenize the reactive mediums can be envisaged, and in particular, it is possible to envisage stirring by ultrasonics.

But, those skilled in the art will be able to select any appropriate couples of physico-chemical reactions in order to carry out the invention, the important feature being that these reactions present, in the Clapeyron diagram, equilibrium curves that intersect in the working temperature range.

Thus, it is possible to select two equilibrium reactions between a solid and a gas; for example, one reactor may be provided with ammoniated zinc sulfate and the other reactor with ammoniated strontium chloride so as to initiate the following reactions:

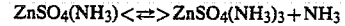

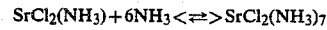

We claim:

1. A thermochemical device for storing and unstoring heat with increasing thermal potential, which device comprises, first and second reactors, each in contact with an external medium, the said first and second reactors, each comprising first and second reversible monovariant exothermic reactions, respectively, between a gas and first and second reagents, respectively, the said first and second reactions having Clapeyron curves that intersect in the working temperature range of the said device, and said first and second reactors being connected to each other by a communicating pipe so as to define a confined space and permit the transfer of the gas between the reactors.

2. A heat pump comprising the device of claim 1.

3. In a method of thermochemically storing and unstoring heat of the type, wherein reaction products are formed and decomposed in first and second reactor means in which dissimilar first and second reactions take place respectively, said first and second reactions each including reversible monovariant exothermic or endothermic reactions between dissimilar first and second reagents, respectively, said reagents combining with the same gas to produce first and second reaction products, respectively, and said thermochemical method:

heats at constant temperatures $T_1$ and decomposes said first reaction product, in said first means and liberates said gas from said first reagent at pressure $P_1$, transfers said gas from said first reactor means to said second reactor means at constant pressure $P_1$ and reacts said gas exothermically with said second reagent at constant pressure $P_1$ to form said second reaction product at temperatures $T_2$, wherein $T_2$ is a higher temperature than $T_1$, the improvement comprising:

in the first and second reactor means, comprising the first and second reactions, respectively, having Clapeyron curves intersecting at temperature $T_0$, greater than $T_2$ and $T_1$, heating at constant temperatures $T_3$, a temperature higher than $T_0$, $T_2$ or $T_1$, raising from temperatures $T_2$ to temperatures $T_3$, and decomposing said second reaction product in said second reactor means and liberating said gas from said second reagent at pressure $P_3$, which is greater than pressure $P_1$, transferring the gas at constant pressure $P_3$ from said second reactor means to said first reactor means, reacting said gas exothermically with said first reagent at constant pressure $P_3$ to form said first reaction product at temperatures $T_4$, wherein $T_4$ is a higher temperature than $T_3$, $T_0$, $T_2$, or $T_1$ and repeating the steps of the above cycle in the same sequence.

4. A method according to claim 3, wherein said first or second reagent is a solid.

5. A method according to claim 4, wherein said solid is an alloy adapted to release said gas.

6. A method according to claim 3, wherein said gas is selected from a group consisting of $H_2$, $H_2O$ vapor (steam), $CO_2$, $SO_2$, $SO_3$, $SO_2+SO_3$ mixtures, ammonia and its derivatives, $NO_2$ and the alcohols.

7. A method according to claim 6, wherein said solid is an alloy or mixture of alloys adapted to release said gas.

8. A method according to claim 7, wherein said alloy(s) is(are) selected from a group consisting of: $CeNi_3Cu_2$, $CeNi_{2.5}Cu_{2.5}$, $Ce_{11}Ni_{2.5}Cu_{2.5}$, $LaNi_5$, $LaNi_{4.9}Al_{0.1}$, $LaNi_{4.75}Al_{0.25}$, $LaNi_{4.6}Al_{0.4}$, $LaNi_{4.5}Al_{0.5}$, $LaNi_{4.25}Al_{0.75}$, $LaNi_4Al$, $LaNi_{4.95}Mn_{0.5}$, $LaNi_{4.83}Mn_{0.17}$, $LaNi_{4.65}Mn_{0.35}$, $LaNi_{4.56}Mn_{0.44}$, $LaNi_{4.30}Mn_{0.70}$, $LaNi_{4.06}Mn_{0.94}$, $Zr_{0.8}Ti_{0.2}MnFe$, $ZrCr_{0.6}Fe_{1.4}$, $Zr_{0.8}Ti_{0.2}Cr_{0.6}Fe_{1.4}$, $Zr_{0.7}Ti_{0.3}Mn_2$, $Zr_{0.8}Ce_{0.2}Mn_2$, $ZrMn_{2.8}$, $ZrMn_{3.8}$, $ZrMn_2Cu_{0.8}$, $NiZr$, $Mg_{2.4}Ni$, $Mg(LaNi_5)$ 20%.

9. A method according to claim 8, wherein said gas is hydrogen.

10. A method according to claim 3, wherein said first or second reagent is a saturated solution of a solid.

11. The method of claim 3 wherein during each cycle the accumulation of heat energy collected increases.

12. The process of claim 3 wherein $T_4$ is increasing with each successive cycle.

* * * * *